(12) United States Patent
Hashimoto

(10) Patent No.: US 8,908,196 B2
(45) Date of Patent: Dec. 9, 2014

(54) PRINT CONTROL DEVICE, PRINT CONTROL METHOD, AND PROGRAM THEREOF

(75) Inventor: Takahiro Hashimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 13/229,925

(22) Filed: Sep. 12, 2011

(65) Prior Publication Data

US 2012/0062919 A1 Mar. 15, 2012

(30) Foreign Application Priority Data

Sep. 15, 2010 (JP) ................................. 2010-207286

(51) Int. Cl.
*G06K 15/00* (2006.01)
*G06F 3/12* (2006.01)
*G06K 1/00* (2006.01)

(52) U.S. Cl.
CPC ............ *G06F 3/1288* (2013.01); *G06F 3/1285* (2013.01); *G06F 3/1259* (2013.01); *G06F 3/1203* (2013.01); *G06F 3/1207* (2013.01); *G06F 3/126* (2013.01)
USPC ............ 358/1.12; 358/1.1; 358/1.9; 358/1.16

(58) Field of Classification Search
CPC ... G06F 3/1259; G06F 3/1215; G06F 3/1296; G06F 3/1273; G06K 15/16; G06K 15/1809
See application file for complete search history.

(56) References Cited

U.S. PATENT DOCUMENTS

| | | | |
|---|---|---|---|
| 6,348,971 B2* | 2/2002 | Owa et al. | 358/1.15 |
| 2003/0002056 A1* | 1/2003 | Yamaguchi et al. | 358/1.2 |
| 2003/0016374 A1* | 1/2003 | Christodoulou et al. | 358/1.12 |
| 2006/0285148 A1 | 12/2006 | Matsushima et al. | |
| 2010/0020356 A1 | 1/2010 | Kawasaki | |
| 2011/0188061 A1* | 8/2011 | Miyamoto | 358/1.12 |
| 2011/0193910 A1* | 8/2011 | Murakami et al. | 347/16 |

FOREIGN PATENT DOCUMENTS

| | | |
|---|---|---|
| JP | 10-269047 | 10/1998 |
| JP | 11-129582 | 5/1999 |
| JP | 2002-149388 | 5/2002 |
| JP | 2003-84949 | 3/2003 |
| JP | 2004-334424 | 11/2004 |
| JP | 2006-53891 | 2/2006 |
| JP | 2006-289735 | 10/2006 |
| JP | 2007-144699 | 6/2007 |
| JP | 2007-213613 | 8/2007 |
| JP | 4092068 | 7/2008 |

OTHER PUBLICATIONS

European Search Report dated Jun. 24, 2013 in corresponding European Patent application No. 11 18 1161.8.

* cited by examiner

*Primary Examiner* — Thierry L Pham
(74) *Attorney, Agent, or Firm* — Cooper & Dunham LLP

(57) ABSTRACT

A print control device including a sheet-base printing speed table that indicates a sheet-base printing speed for each printer; a printing time calculation unit that calculates a printing time associated with a print job based on a printing speed corresponding to a sheet used for the print job by referencing the sheet-base printing speed table; and a first display control unit that displays the print job in a predetermined display mode that has a length proportional to the printing time that is calculated.

17 Claims, 13 Drawing Sheets

| SHEET | | | | SPEED | |
|---|---|---|---|---|---|
| NAME | THICKNESS [g/m²] | WIDTH [mm] | LENGTH [mm] | SINGLE-SIDED | DUPLEX |
| A3 PLAIN PAPER | 74 | 297 | 420 | 40 | 18 |
| A4 PLAIN PAPAR | 64 | 210 | 297 | 80 | 40 |
| B5 PLAIN PAPER | 60 | 182 | 257 | 75 | 35 |
| A4 THICK PAPER | 100 | 210 | 297 | 35 | 20 |
| LETTER | 65 | 215.9 | 279.4 | 40 | 18 |
| LEGAL | 70 | 215.9 | 355.6 | 40 | 18 |
| TABLOID | 75 | 279.4 | 431.8 | 40 | 18 |
| POSTCARD | 190 | 100 | 148 | 15 | 8 |
| ... | ... | ... | ... | ... | ... |
| UNDEFINED | - | - | - | 80 | 30 |

FIG.4

| ITEM | DESCRIPTION |
|---|---|
| ID | JOB ID |
| NAME | JOB NAME |
| COPIES | NUMBER OF COPY SETS |
| DUPLEX | WHETHER INVOLVES DUPLEX PRINTING |
| MEDIA | SHEET USED FOR JOB |
| OUTPUT BIN | OUTPUT LOCATION OF JOB |
| PUNCH | POSITION AND NUMBER OF HOLE PUNCHES |
| REQUESTED PRINTER | PRINTER REQUESTED TO PRINT |
| STAPLE | POSITION AND NUMBER OF STAPLES |
| RETAIN DURATION | RETENTION PERIOD OF JOB |
| CUSTOMER | CUSTOMER NAME OF JOB |
| DESCRIPTION | DESCRIPTION OF JOB |
| INPUT DATA STREAM | DATA FORMAT OF INPUT FILE |
| INPUT FILE SIZE | SIZE OF INPUT FILE |
| TOTAL PAGES | NUMBER OF PAGES OF JOB |
| TOTAL SHEETS | NUMBER OF SHEETS OF JOB |
| PAGES STACKED | NUMBER OF PAGES OUTPUT TO STACKER |
| SHEETS STACKED | NUMBER OF SHEETS OUTPUT TO STACKER |
| COPIES STACKED | NUMBER OF COPY SETS OUTPUT TO STACKER |
| CUMULATIVE PAGES STACKED | NUMBER OF PAGES OUTPUT TO STACKER INCLUDING REPRINTS |
| CUMULATIVE SHEETS STACKED | NUMBER OF SHEETS OUTPUT TO STACKER INCLUDING REPRINTS |
| ASSIGNED TO PRINTER | DATE AND TIME WHEN JOB IS RECEIVED AT PRINTER |
| SIZE | SIZE OF JOB |
| NUMBER OF REPRINTS | NUMBER OF REPRINTS OF JOB |
| SUBMITTED | DATE AND TIME WHEN JOB IS CREATED |
| PAGE RANGE | RANGE OF PAGE TO PRINT |
| FOLDING | INFORMATION ON FOLDING OF JOB |
| BINDING | INFORMATION ON BINDING OF JOB |

FIG.5

| ITEM | DESCRIPTION |
|---|---|
| ID | JOB ID |
| STATUS | STATUS OF JOB |
| PROGRESS | PROGRESS STATE OF JOB |
| REASON FOR WAIT | REASON WHY JOB IS IN WAITING STATE |
| ASSIGNED PRINTER | PRINTER TO PRINT JOB |
| PRINT AFTER TIME | TIME WHEN PRINTING STARTS |
| COMPLETION TIME | TIME WHEN PRINTING IS COMPLETED |
| DURATION | PROCESSING TIME |

FIG.6

| PRINTER NAME | STATE | IP ADDRESS | ... |
|---|---|---|---|
| PRINTER 1 | READY | 166.192.195.131 | |
| PRINTER 2 | STOP | 166.192.195.132 | ... |
| ⋮ | ⋮ | ⋮ | |

FIG.7

| SHEET | | | | SPEED | |
|---|---|---|---|---|---|
| NAME | THICKNESS [g/m$^2$] | WIDTH [mm] | LENGTH [mm] | SINGLE-SIDED | DUPLEX |
| A3 PLAIN PAPER | 74 | 297 | 420 | 40 | 18 |
| A4 PLAIN PAPAR | 64 | 210 | 297 | 80 | 40 |
| B5 PLAIN PAPER | 60 | 182 | 257 | 75 | 35 |
| A4 THICK PAPER | 100 | 210 | 297 | 35 | 20 |
| LETTER | 65 | 215.9 | 279.4 | 40 | 18 |
| LEGAL | 70 | 215.9 | 355.6 | 40 | 18 |
| TABLOID | 75 | 279.4 | 431.8 | 40 | 18 |
| POSTCARD | 190 | 100 | 148 | 15 | 8 |
| ... | ... | ... | ... | ... | ... |
| UNDEFINED | - | - | - | 80 | 30 |

FIG.8

| TRAY LIST | LOADED SHEET LIST |
|---|---|
| TRAY 1 | A3 PLAIN PAPER |
| TRAY 2 | A4 PLAIN PAPER |
| TRAY 3 | NONE |
| TRAY 4 | NONE |
| TRAY 5 | NONE |
| TRAY 6 | NONE |
| TRAY 7 | NONE |
| BYPASS TRAY | NONE |

FIG.9

| SHEET CHANGE JOB ID | ALLOCATED PRINTER | ALLOCATION ORDER | SHEET CHANGE INFORMATION | CHANGE TIME | MESSAGE | PRINT SEPARATOR SHEET |
|---|---|---|---|---|---|---|
| MEDIA CHANGE 1 | PRINTER 1 | AFTER LAST SCHEDULED JOB | CHANGE FROM A4 PLAIN PAPER TO A3 PLAIN PAPER FOR TRAY 1 | 5 MINUTES | SHEETS ARE UNDER TABLE | YES |
| MEDIA CHANGE 2 | PRINTER 2 | BEFORE MEDIA CHANGE 1 | CHANGE FROM LETTER TO A4 PLAIN PAPER FOR TRAY 1 | 5 MINUTES | | YES |

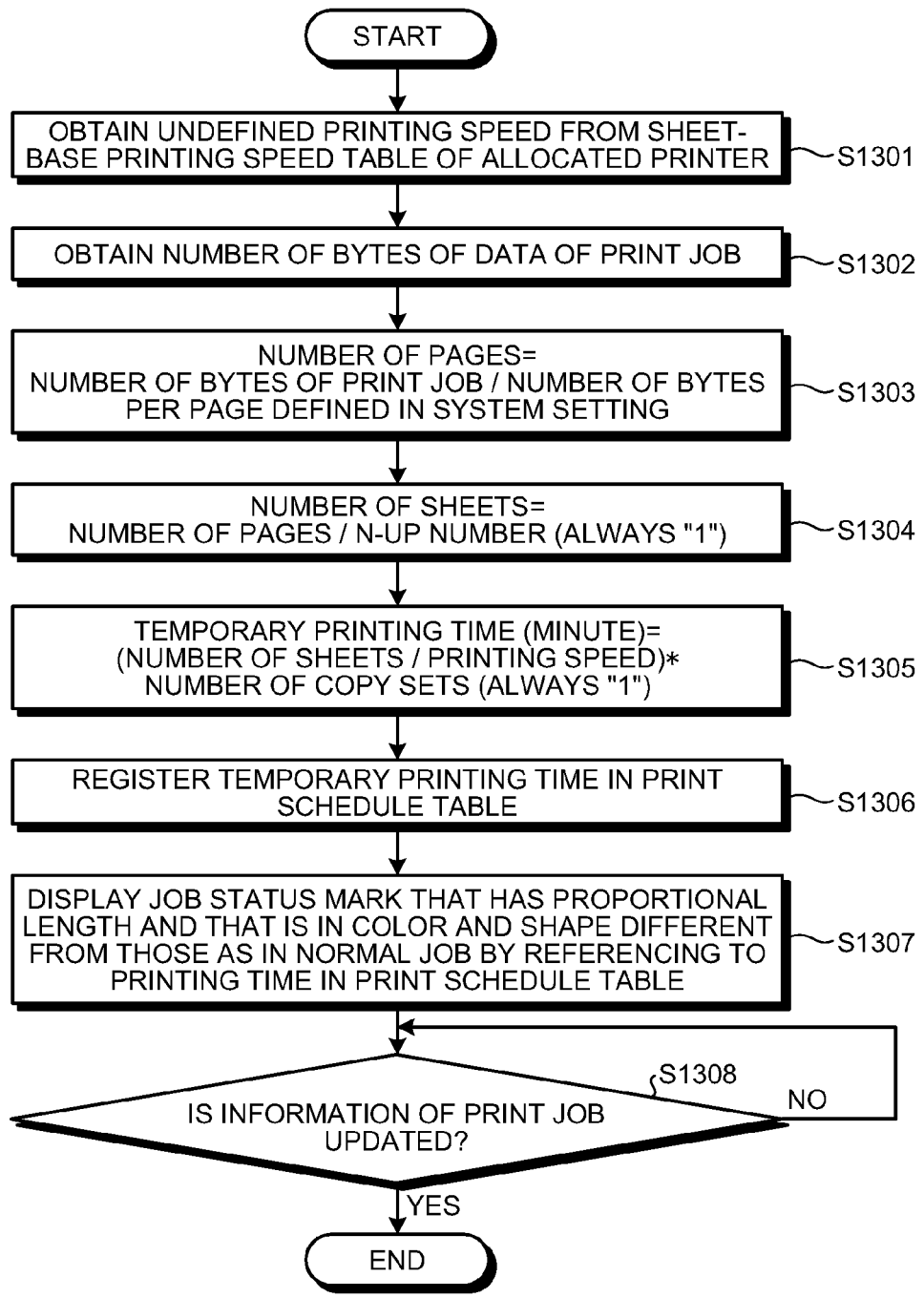

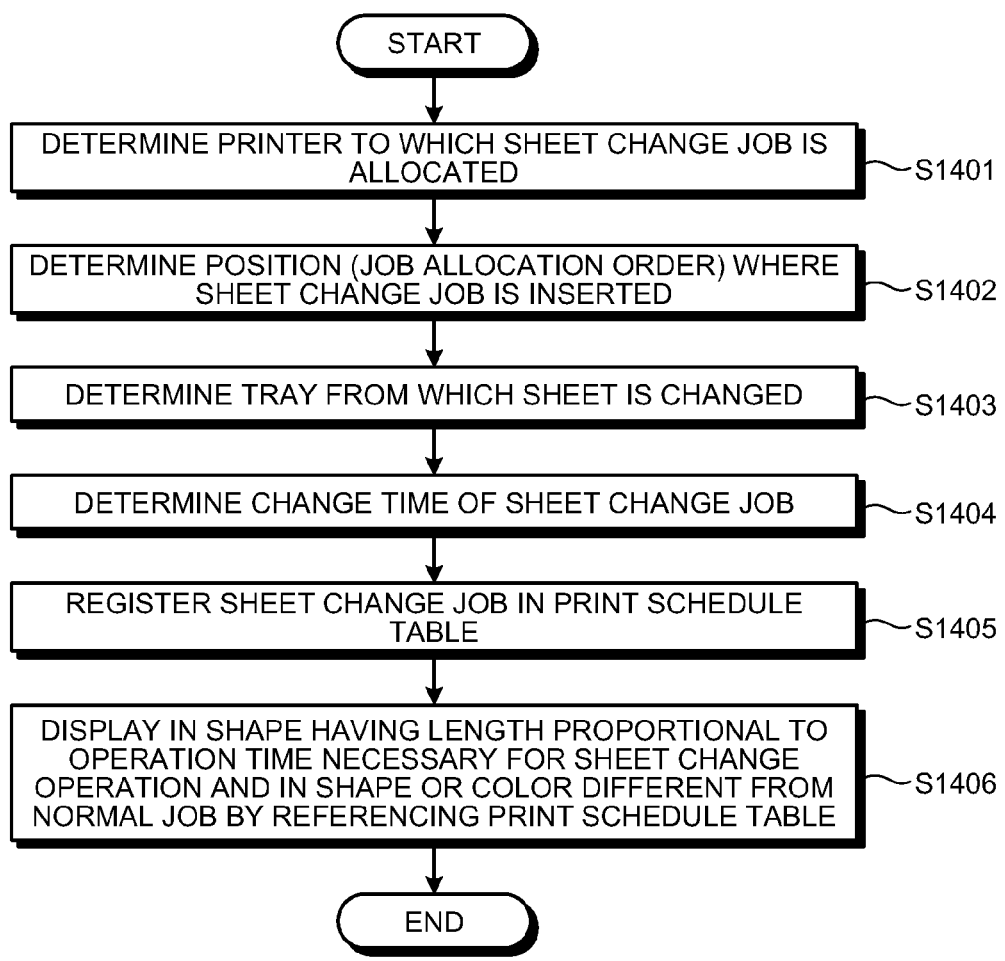

FIG.15A

CREATE MEDIA CHANGE JOB (1500)

ON WHICH PRINTER DO YOU WANT TO CREATE THE MEDIA CHANGE JOB?

PRINTER: [PRINTER 1 ▽] (1501)

WHERE DO YOU WANT TO CREATE THE MEDIA CHANGE JOB?

(1502)
- ◉ AFTER LAST SCHEDULED JOB
- ○ BEFORE
  MEDIA CHANGE [  ▽]

MEDIA CHANGE TIME [ 5 ] (1503)

[NEXT] (1504)  [CANCEL] (1505)

FIG.15B

CREATE MEDIA CHANGE JOB (1510)

WHAT SHOULD HAPPEN WHEN THE MEDIA CHANGE JOB REACHES THE PRINTER?

NAME * [          ] (1511)

| TRAY | BEFORE | AFTER | (1512) |
|---|---|---|---|
| TRAY 1 |  |  |  |

SHOW MESSAGE [          ] (1513)

PRINT SEPARATOR SHEET ☐ (1514)

[PREVIOUS] (1515)  [CANCEL] (1516)  [FINISH] (1517)

PRINT CONTROL DEVICE, PRINT CONTROL METHOD, AND PROGRAM THEREOF

CROSS-REFERENCE TO RELATED APPLICATIONS

The present application claims priority to and incorporates by reference the entire contents of Japanese Patent Application No. 2010-207286 filed in Japan on Sep. 15, 2010.

BACKGROUND OF THE INVENTION

1. Field of the Invention

The present invention relates to a print control device, a print control method, and a program thereof.

2. Description of the Related Art

In the related art, a service called "copy service," "printing service," or the like is known in which a designated document requested by a customer is printed by a designated number of copy sets, and the printed sheets are bound in a designated method and delivered. A printing agency, providing such a service, schedules printing orders received from customers so as to meet the deadline, taking human and material resources into consideration, and then performs printing. Thus, there is a need for a system capable of accurately checking whether scheduled jobs are done as planned and of efficiently executing printing, and such a system has been proposed.

As an example, Japanese Patent Application Laid-open No. 2002-149388 discloses a printer control device which solves a problem of a conventional system in that it is difficult to understand the total amount of loads in an entire printing system and a distribution state of the load to respective printers, and which includes a schedule view for displaying a load state of printers within the system in realtime and graphically. Specifically, this printer control device allocates a print job to any of the printers and calculates the time needed for the printer to which the print job is allocated to perform printing. The calculated time is displayed with a predetermined shape having a length proportional to the time. Moreover, the predetermined shapes corresponding to all print jobs which are allocated to the printers and have not been completed are displayed by arranging at regular intervals in the horizontal or vertical direction to thereby show the load states of the respective printers. With this configuration, it is possible to understand the total amount of loads in an entire printing system and a distribution state of the load to respective printers.

However, in the printer control device having the schedule view disclosed in Japanese Patent Application Laid-open No. 2002-149388 or the like, several factors that affect calculation of the printing time are not taken into consideration. For example, the printing speed of a printer changes depending on a sheet used for the printing. That is, the printing speed of a printer depends on the thickness, width, and length of a sheet. Specifically, if the thickness of a sheet increases, the printing speed decreases in order to fix toner sufficiently. If the width of a sheet has a predetermined size or smaller, the printing speed decreases in order to prevent overheating of a heat roller. Moreover, if the length of a sheet increases, the printing speed decreases since a sheet conveying length increases. In particular, since various types of sheets are used in the printers used by the printing agency, the effect of a difference in sheet is great. Thus, if some factors that affect the calculation of the printing time are not taken into consideration; a print job in which it is not possible to obtain the information such as the number of pages to print is input; or a factor such as the time needed for changing sheets between print jobs is not taken into consideration, there is a problem in that the calculated printing time is not appropriate.

SUMMARY OF THE INVENTION

It is an object of the present invention to at least partially solve the problems in the conventional technology.

According to an aspect of the present invention, there is provided a print control device including a sheet-base printing speed table that indicates a sheet-base printing speed for each printer; a printing time calculation unit that calculates a printing time associated with a print job based on a printing speed corresponding to a sheet used for the print job by referencing the sheet-base printing speed table; and a first display control unit that displays the print job in a predetermined display mode that has a length proportional to the printing time that is calculated.

According to another aspect of the present invention, there is provided a print control method for a print control devise having a sheet-base printing speed table that indicates a sheet-base printing speed for each printer, the method including calculating, by a printing time calculation unit of the print control device, a printing time associated with a print job by referencing the sheet-base printing speed table based on a printing speed corresponding to a sheet used for the print job; and calculating a printing time associated with a print job based on a printing speed corresponding to a sheet used for the print job by referencing the sheet-base printing speed table; and displaying the print job in a predetermined display mode that has a length proportional to the printing time that is calculated.

According to still another aspect of the present invention, there is provided an computer program product including a non-transitory computer-usable medium having computer-readable program codes embodied in the medium for print control in a print control device having a sheet-base printing speed table that indicates a sheet-base printing speed for each printer, the program codes when executed causing a computer to execute calculating a printing time associated with a print job based on a printing speed corresponding to a sheet used for the print job by referencing the sheet-base printing speed table; and displaying the print job in a predetermined display mode that has a length proportional to the printing time that is calculated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of items registered in a print job table;

FIG. 5 is a diagram illustrating an example of items registered in a print schedule table;

FIG. 6 is a diagram illustrating an example of a printer table;

FIG. 7 is a diagram illustrating an example of a sheet-base printing speed table;

FIG. 8 is a diagram illustrating an example of a tray-base sheet table;

FIG. 9 is a diagram illustrating an example of a sheet change job table;

FIG. 13 is a flowchart illustrating a temporary calculation process;

FIG. 14 is a flowchart illustrating a flow of processes from an allocation of a sheet change job to a displaying of a schedule view;

FIG. 15A is a diagram illustrating a GUI used when creating a sheet change job;

FIG. 15B is another diagram illustrating a GUI used when creating a sheet change job.

DETAILED DESCRIPTION OF THE PREFERRED EMBODIMENTS

Figure 1:
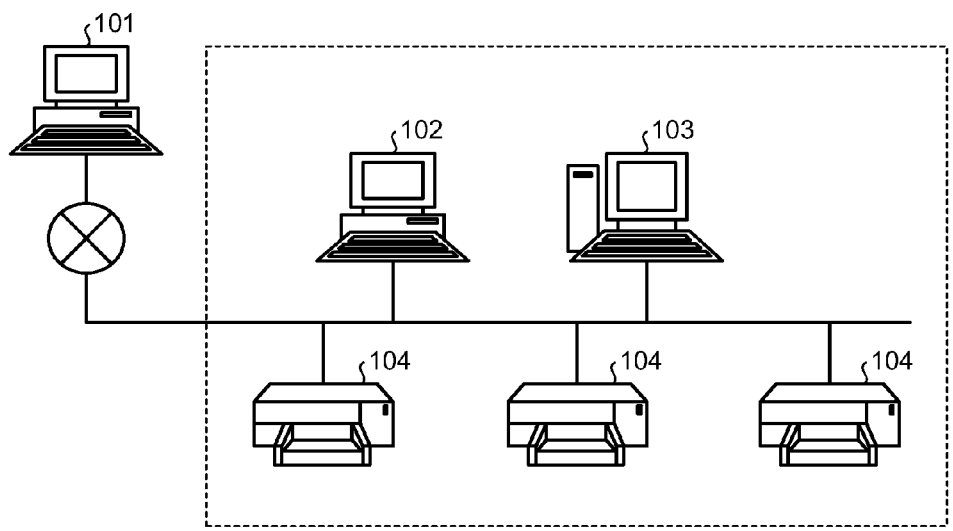
FIG. 1 is a diagram illustrating a system configuration of a printing system including a print control device according to the present embodiment.

Hereinafter, an embodiment of a print control device according to the present invention will be described in detail with reference to the accompanying drawings.

First, an overview of a print control device according to the present embodiment will be described.

(1) The speed of a printer changes depending on the sheet used during printing, and the printing time changes. A printing speed of a printer depends on the thickness, width, and length of a sheet. Specifically, if a sheet is thick, the printing speed decreases in order for toner to sufficiently be fixed. If the width of a sheet is a predetermined size or smaller, the printing speed decreases in order to prevent excessive heating of a heat roller. Moreover, if a sheet length increases, since the sheet conveying length increases, the printing speed decreases. In order to reflect this on the printing time, a sheet-base printing speed table for each of the sheets corresponding to each printer is prepared. A printing time calculation unit acquires a printer speed by referencing a sheet-base printing speed table of a printer to which a print job is allocated based on sheet information of a print job when printing is performed on the sheet by the printer to thereby calculate a printing time considering the printing speed of a printer changed by a printing sheet.

(2) When a print job that can be printed by a printer has a data format different from a print job corresponding to a print control device, the content of information obtainable from the print job may be different. In this case, it may be not possible to obtain information such as the number of pages which affects the calculation of the printing time. In order to eliminate this problem, by providing the printing time calculation unit with the following unit (details of which are described later), an appropriate printing time is calculated even when it is not possible to obtain information which affects the calculation of the printing time from a print job.

(a) The printing time calculation unit includes a temporary printing time calculation unit that calculates the number of sheets from a value (for example, the number of pages per unit amount of data) defined in advance as a system configuration so that it is possible to calculate the printing time of a print job in which it is not possible to obtain information such as the number of pages.

(b) When the printing time of a print job is temporarily calculated, a job graph display unit displays the print job using a predetermined shape having a length proportional to the temporarily calculated value, and let an operator know that the printing time of the job is a temporarily calculated value.

(c) A schedule view display unit includes a unit capable of changing information of a print job so that when an operator knows the number of pages or other information of a job of which the printing time is temporarily calculated, a correct printing time can be calculated again in response to a change in the information of the job.

(3) In order to properly display the total amount of loads in an entire printing system and a distribution state, it is necessary to take the time needed for the sheet change operation into consideration in addition to the time when a printer performs printing. Thus, a display unit that displays a tray that can be used in the printer and a sheet currently loaded on the tray is provided. Moreover, a unit (print control device) for allocating print jobs to any of the printers includes a unit for comparing the sheets being loaded and allocating a sheet change job instructing to perform a sheet change operation to a printer and a unit for displaying the print job in a predetermined shape having a length proportional to the processing time needed for the sheet change operation. In this way, an operator can view the sheet change job and the total amount of loads in an entire printing system including the time needed for the job and a distribution state.

The print control device of the present embodiment is capable of improving the accuracy of the calculated printing time from the features (1) to (3) described above and displaying the overall load of the printing system so as to be understood in an accurate manner.

Next, a system configuration of a printing system including a print control device according to the present embodiment will be described with reference to FIG. 1. FIG. 1 is a diagram illustrating a system configuration of a printing system including a print control device according to the present embodiment. In the following description, a print server corresponds to a print control device.

In FIG. 1, reference numeral 101 is a user client (client PC, client personal computer), and is a computer that a customer uses to order printing jobs to a printing agency. The operator can send printing target documents from the user client 101 to a print server 103 together with a job ticket with the aid of a predetermined application.

Reference numeral 102 is a management client, and is a computer that an operator of the printing agency uses to manage printing jobs requested. The operator can access a Web user interface of the print server 103 using a WWW browser from the management client 102 to retrieve documents to be printed, start, stop, and delete a print job, and manage the system.

Reference numeral 103 is the print server that controls printers 104 so that documents requested from the user client 101 are printed. Moreover, the print server 103 displays an operation state or the like of the respective printers 104 in realtime and graphically.

Reference numeral 104 is a printer such as a multi-function peripheral (MFP) that generates print images from the data of printing documents in accordance with the control of the print server 103 and prints the images on a predetermined sheet.

Figure 2:
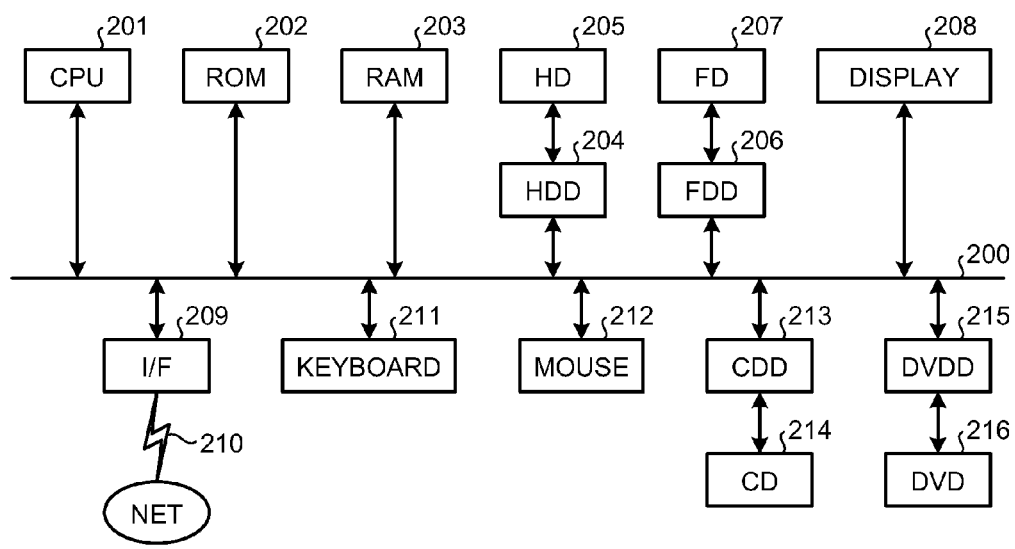
FIG. 2 is a block diagram illustrating a hardware configuration of a print server (print control device)

Next, a hardware configuration of the print server 103 will be described with reference to FIG. 2. FIG. 2 is a block diagram illustrating a hardware configuration of the print server 103.

As shown in FIG. 2, the print server 103 includes a central processing unit (CPU) 201 that controls the operation of the print server 103. The CPU 201 is connected to a read only memory (ROM) 202 that stores programs executed by the CPU 201 during startup and necessary data or the like and a random access memory (RAM) 203 that constitutes a work area or the like of the CPU 201 through a connection line 200 such as an internal bus.

The CPU 201 is also connected to a keyboard 211, a mouse 212, a compact disc drive (CD drive, CDD) 213 to which a compact disc (CD) 214 is loaded, a digital versatile disk drive (DVD drive, DVDD) 215 to which a digital versatile disk (DVD) 216 is loaded, a hard disk drive (HDD) 204 having a hard disk (HD) 205 therein, an flexible disk drive (FD drive, FDD) 206 to which an flexible disk (FD) 207 is loaded, and a display 208 through various input/output interfaces (I/F) which are not shown. The CPU 201 exchanges data with these respective constituent elements and controls exchange of data between the respective constituent elements.

A network I/F 209 executes a communication control process for exchanging various data with other servers and clients through a communication line 210 such as the Internet, transmits print data and the like to the printers 104 connected to the network, and receives data and the like representing printing state information from the printers 104.

The HDD 204 stores an operating system (OS), various application programs running on the OS, and various data such as work data, file data, and image information data. In the present embodiment, a print data transmission program or the like is stored as the application program. Moreover, the CD drive 213, the DVD drive 215, and the FD drive 206 read data (various application programs and various data such as work data, file data, and image information data) stored in the CD-ROM (CD 214), the DVD-ROM/RAM (DVD 216), and the FD 207 which are removable storage media. Data can be written to the DVD-RAM and the FD 207.

In the print server 103, when a user presses a power button, the CPU 201 activates a loader (program) in the ROM 202, reads an OS from the HDD 204 into the RAM 203, and activates the OS. The activated OS runs an application programs and reads and stores information in accordance with an operation of a user. Moreover, the application program is not limited to one which runs on a predetermined OS, but may be one which causes the OS to execute a part of various kinds of processes described later. Moreover, the application program may be one which is included as a part of a group of program files that constitute predetermined application software, the OS, and the like.

Moreover, a display controller (not shown) which is one of the input/output I/Fs controls the display 208 such as a liquid crystal display (LCD) or a cathode ray tube (CRT) and displays characters, images, and the like corresponding to the display data received from the CPU 201 on the display 208. Moreover, an input controller (not shown) which is one of the input/output I/Fs takes in an input signal in response to the operation on the keys of the keyboard 211 and an input signal in response to the operation of a pointing device such as the mouse 212 and notifies the CPU 201 of the input signals.

Figure 3:
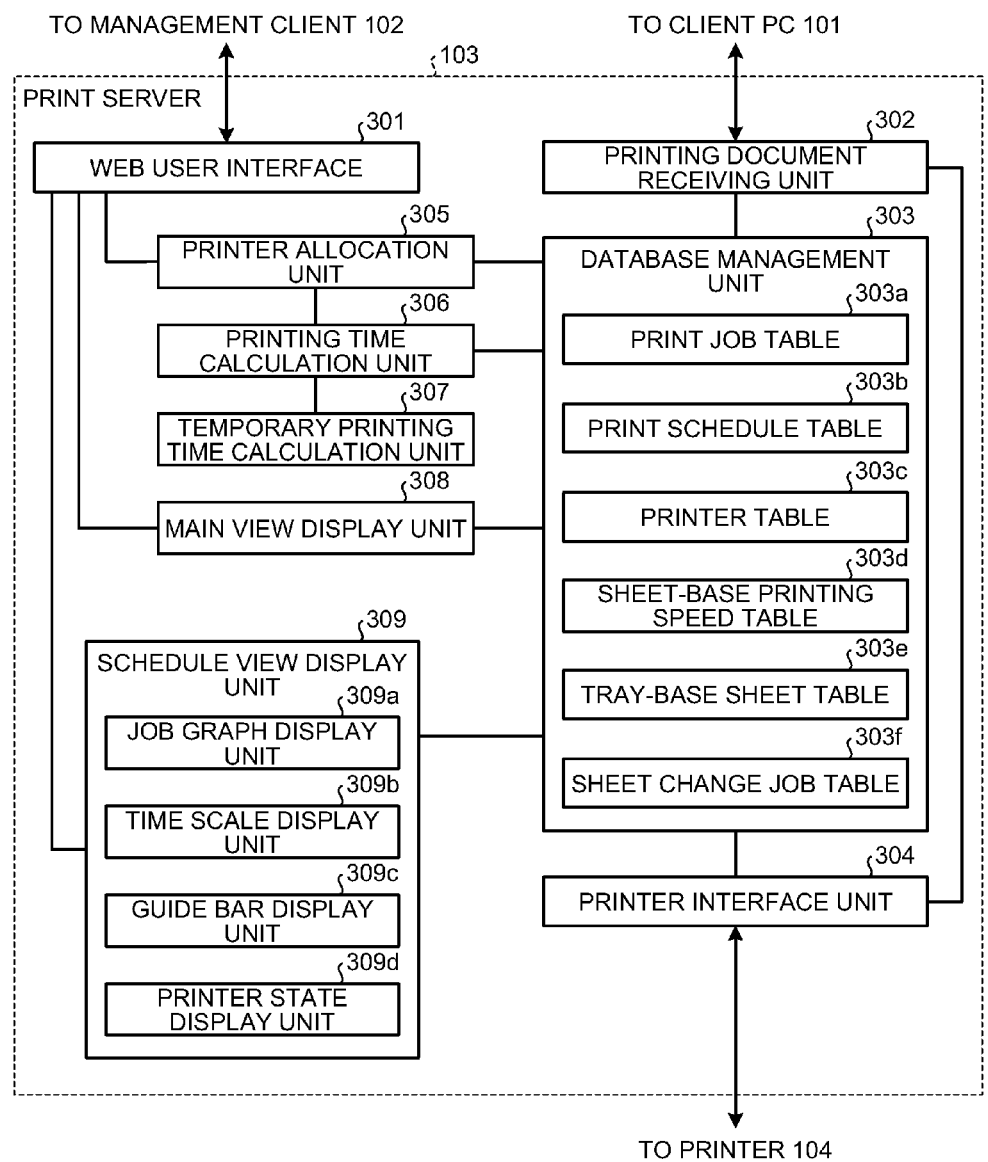
FIG. 3 is a diagram illustrating a functional configuration of the print server.

Next, a functional configuration of the print server 103 will be described with reference to FIG. 3. FIG. 3 is a diagram illustrating a functional configuration of the print server 103.

In FIG. 3, reference numeral 301 is a Web user interface that controls communication with the management client 102 and receives requests from the management client 102, the requests are about to retrieve documents, start, stop, and delete a print job, manage the system, and the like.

Reference numeral 302 is a printing document receiving unit that receives printing document data or a job ticket from the user client 101. The received data is registered in a database management unit 303 as a job. When a print job is scheduled in any of the printers 104, the print job is controlled to be performed by the printer 104 through a printer interface 304.

Reference numeral 303 is a database management unit that receives requests from the printer interface 304, a printer allocation unit 305, a printing time calculation unit 306, and the printing document receiving unit 302 and writes data to tables held therein, including a print job table 303a, a print schedule table 303b, a printer table 303c, a sheet-base printing speed table 303d, a tray-base sheet table 303e, and a sheet change job table 303f.

Here, the print job table 303a is a table for storing the detailed contents of print jobs input from the user client 101 or the like. FIG. 4 shows an example of items registered in the print job table 303a. In the example of the figure, various items are included, which are ID (job ID), name (job name), copies (the number of copy sets), duplex (whether involves duplex printing), media (sheet used for job), output bin (output location of job), punch (position and number of hole punches), requested printer (printer requested to print), staple (position and number of staples), retain duration (retention period of job), customer (customer name of job), description (description of job), input data stream (data format of input file), input file size (size of input file), total pages (the number of pages of job), total sheets (the number of sheets of job), pages stacked (the number of pages output to stacker), sheets stacked (the number of sheets output to stacker), copies stacked (the number of copy sets output to stacker), cumulative pages stacked (the number of pages output to stacker including reprints), cumulative sheets stacked (the number of sheet output to stacker including reprints), assigned to printer (date and time when job is received at printer), size (size of job), number of reprints (the number of reprints of job), submitted (date and time when job is created), page range (range of page to print), folding (information on folding of job), and binding (information on binding of job). As above, various printing conditions are registered in association with a job ID.

The print schedule table 303b is a table for storing printers scheduled to print respective jobs registered in the print job table 303a, the state at the current time point, or the like. FIG. 5 shows an example of items registered in the print schedule table 303b. In the example shown in the figure, respective items are included, which are ID (job ID), status (status of job), progress (progress state of job), reason for wait (reason why job is in waiting state), assigned printer (printer to print job), print after time (the time when printing starts), completion time (the time when printing is completed), and duration (processing time). As above, in the print schedule table 303b, information on scheduling of a job is set in association with a job ID.

The printer table 303c is a table for storing the state (READY, STOP, WARM-UP, PAPER-JAM, TONER-EMPTY, and the like) of the respective printers 104 and connection information such as an IP address in association with a printer name. FIG. 6 shows an example of the printer table 303c.

The sheet-base printing speed table 303d is a table for storing a printing speed (the number of sheets printable within one minute) for each of the sheets corresponding to the printers 104. This table is stored for each printer. FIG. 7 shows an example of the sheet-base printing speed table 303*d*. As shown in the figure, in the sheet-base printing speed table 303*d*, a sheet name, the thickness (g/m²), width (mm), and length (mm) of the sheet are registered as sheet information for each type of sheets. Moreover, a printing speed for single-sided printing and a printing speed for duplex printing are also registered. The printing speed registered in this table is updated sequentially based on printing results at the corresponding printer 104. Moreover, a default sheet-base printing speed is stored in a storage unit such as the HDD 204, and when a new sheet is added to the tray of the printer 104, the default printing speed is registered. Moreover, when a new sheet is registered, the printing speed of a sheet having the closest sheet thickness, width, and length is used.

The tray-base sheet table 303*e* is a table for storing information on a tray corresponding to the printer 104 and information on a sheet currently loaded on the tray. This table is stored for each printer. FIG. 8 shows an example of the tray-base sheet table 303*e*. As shown in the figure, in the tray-base sheet table 303*e*, a list of all trays (tray list) equipped in the printer 104 and a list of sheets loaded on the respective trays are registered (only the list of loaded sheets is registered; and trays in which no sheet is loaded are denoted by "None"). The tray list and the loaded sheet list are updated based on the information that the printer interface 304 included in the network I/F 209 obtains from the respective printers 104.

The sheet change job table 303*f* is a table for storing information on a sheet change job. FIG. 9 shows an example of the sheet change job table 303*f*. As shown in the figure, in the sheet change job table 303*f*, a sheet change job ID, an allocated printer (information for identifying a printer to which a sheet change job is allocated; for example, a printer name), an allocation order (for example, "after the last scheduled job"), sheet change information (for example, "change from A4 plain paper to A3 plain paper for tray 1"), a sheet change time (minutes), the content of a message for informing an operator when changing sheet, and information on whether or not to print a separator sheet indicating a break between printing and sheet changing are registered. When printing the separator sheet, a message for informing the operator is printed on the separator sheet immediately before the sheet change operation. In this way, it is possible to obtain an additional effect that the operator is informed of the time to perform a sheet change operation, thus increasing the efficiency of the sheet change job by the operator.

Now, description will be made with reference to FIG. 3. The printer interface 304 is an interface that controls communication with the printers 104 and retrieves the next jobs to be done by referencing the print schedule table 303*b* whenever it is notified of the completion of job from any of the printers 104. When a print job is found, the printer interface 304 obtains the detailed information from the print job table 303*a* and transmits a job received at the printing document receiving unit 302 to the printers 104. Moreover, the printer interface 304 receives information on the state of the respective printers 104 transmitted at regular intervals from the respective printers 104. The printer interface 304 requests the database management unit 303 to update the printer table 303*c* and the tray-base sheet table 303*e* corresponding to the printer 104, of which the state is changed, with information corresponding to the new state. Moreover, the printer interface 304 calculates the state of the respective jobs based on the state of the respective printers 104 and requests the database management unit 303 to update the state of the respective jobs stored in the print schedule table 303*b*.

The printer allocation unit 305 is a unit that is responsible for allocation of the printers 104 and performs printer allocation automatically based on the property of a print job and the properties of the printers 104 or through manual input. When allocating a print job automatically, in principle, the selected job is allocated to be added after the last scheduled job in a print queue of the printer 104 which has the smallest load at that time point, namely which can start the job at the earliest time. On the other hand, when allocating a job to a printer through manual input, a predetermined dialog (not shown) is displayed when a new job is input, and the operator inputs settings on the allocation using the dialog whereby allocation is performed in accordance with the input settings. Alternatively, the operator inputs settings on the job allocation or changes the settings through a drag-and-drop operation on a job graph when a schedule view described later is displayed, whereby allocation is performed in accordance with the input settings.

When there is a request from the printer allocation unit 305, the printing time calculation unit 306 obtains information on individual input jobs and calculates an estimated time, namely printing time, needed to process the individual jobs in accordance with a predetermined calculation formula based on the information of the jobs (details will be described later).

When the printing time calculation unit 306 is unable to obtain the job information, a temporary printing time calculation unit 307 calculates a temporary printing time based on values set in advance to the system (details will be described later).

Figure 10:
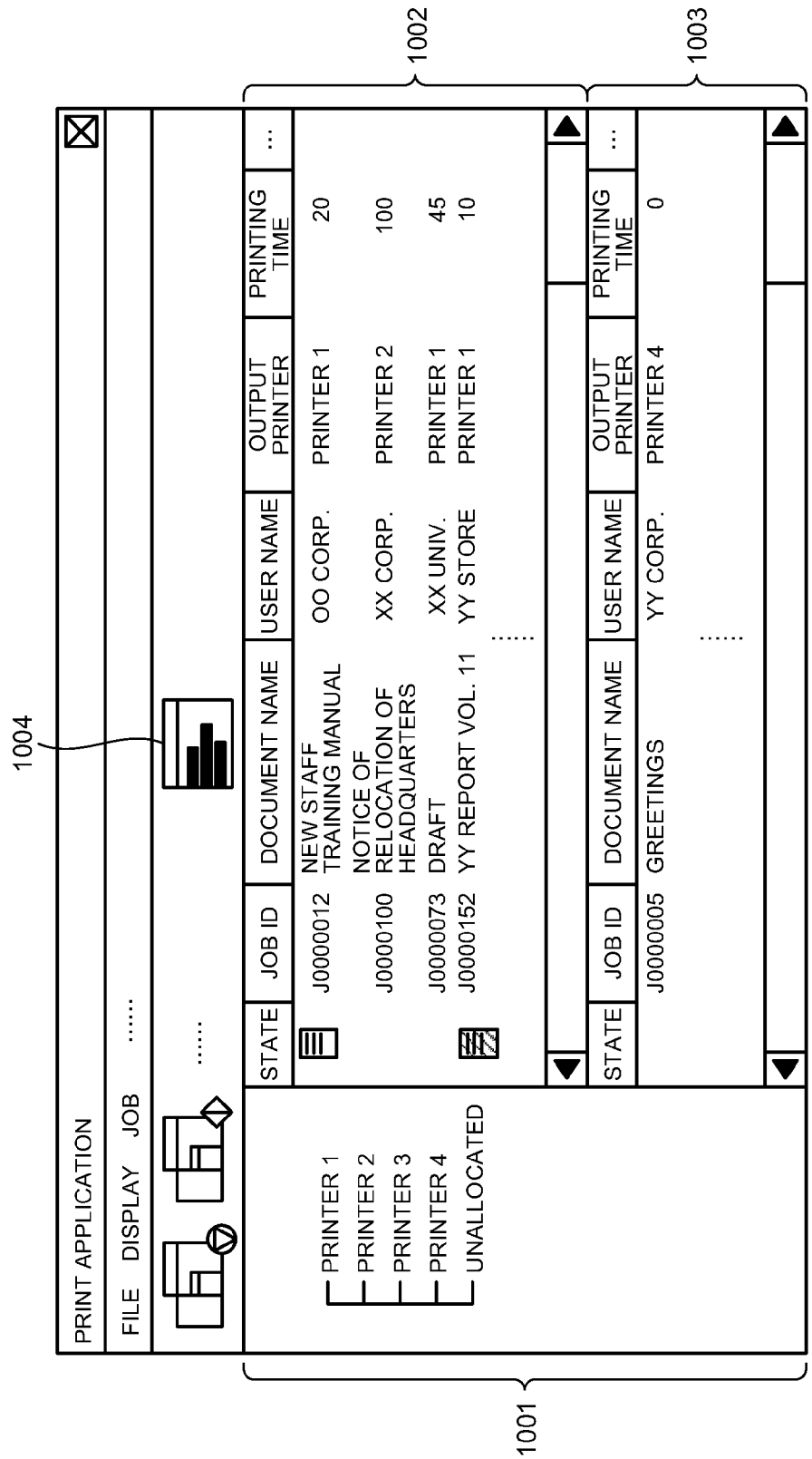
FIG. 10 is a diagram illustrating a display example of a main view.

A main view display unit 308 reads necessary data from the respective tables of the database management unit 303 to display a main view shown in FIG. 10. In the window shown in the figure, all printers 104 being managed by the print server 103 are displayed on a left region 1001.

Moreover, jobs which are scheduled for the selected printer 104 and which have not been completed are listed in a right upper region 1002, and jobs which have been completed by the printer 104 are listed in a right lower region 1003.

Moreover, icons for displaying various views are displayed in the upper region, when a user presses a schedule view icon 1004 on the main view, a schedule view (described later) for displaying an overall system load and load distribution states of the respective printers 104 in an easy-to-view manner is displayed.

A schedule view display unit 309 includes a job graph display unit 309*a*, a time scale display unit 309*b*, a guide bar display unit 309*c*, and a printer state display unit 309*d*.

Figure 11:
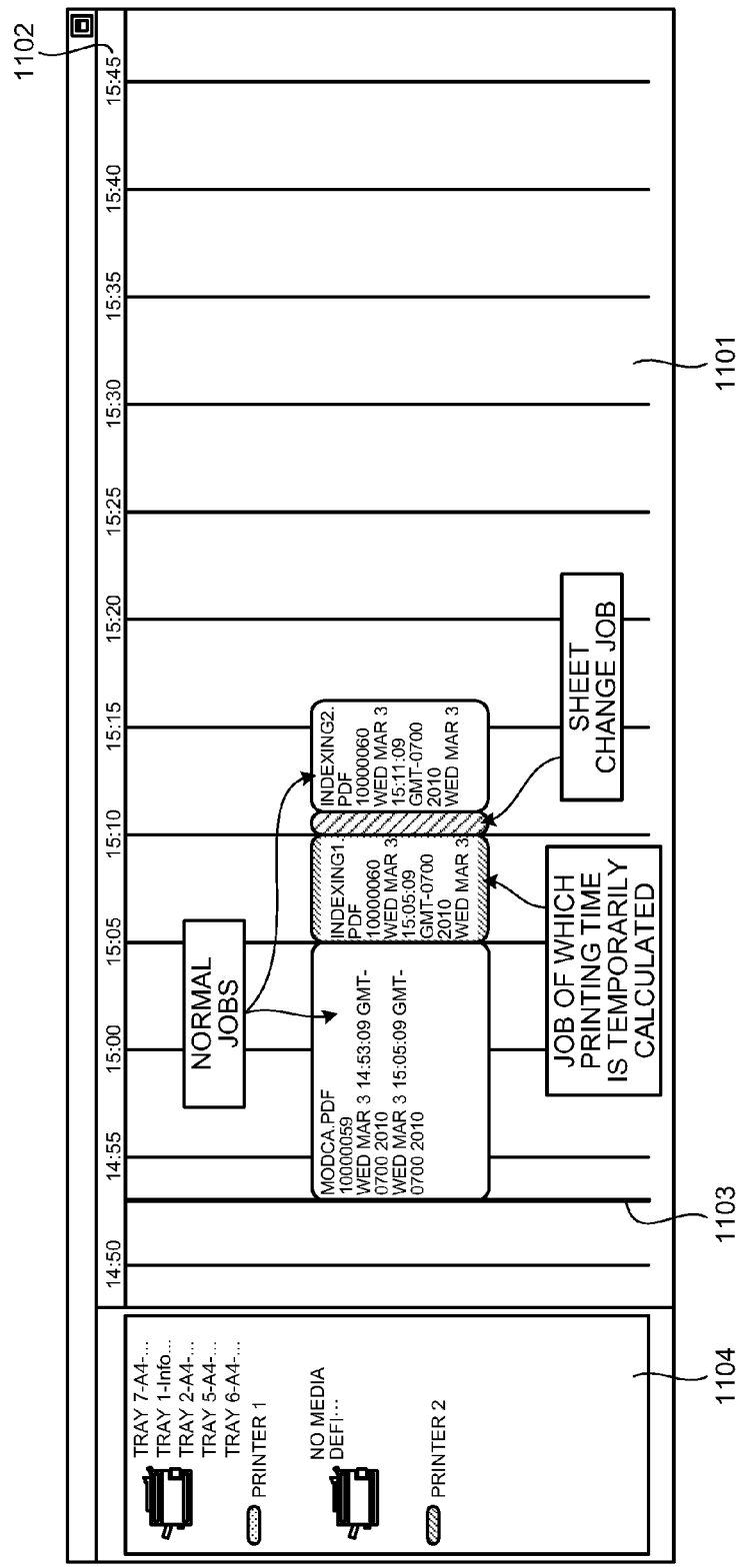
FIG. 11 is a diagram illustrating an example of a schedule view display displayed by a schedule view display unit.

FIG. 11 is a diagram illustrating an example of a schedule view display displayed by the schedule view display unit 309. The schedule view includes a job graph display area 1101, a time scale display area 1102, a guide bar 1103, and a printer state display area 1104 as its major display elements. Although this schedule view is illustrated as an independent view from the main view, the schedule view may be displayed within the main view.

The job graph display area 1101 is drawn by the job graph display unit 309*a*.

Moreover, the time scale display area 1102 is drawn by the time scale display unit 309*b*. Furthermore, the guide bar 1103 is drawn by the guide bar display unit 309*c*. Furthermore, the printer state display area 1104 is drawn by the printer state display unit 309*d*.

Moreover, in the job graph display area 1101, jobs which are allocated to the printer 104 and have not been completed are sequentially displayed in a predetermined shape having a length proportional to the printing time thereof (for example, rectangular) without leaving space. The time scale of the time scale display area 1102 and the display position of the job graph display area 1101 can be moved by using a slide bar (not shown) or moved by dragging using the mouse 212. Moreover, the user may retrieve a job using a retrieval dialog (not shown) and display the job in the job graph display area 1101.

In this specification, a strip (bar)-like rectangular shape formed by arranging the rectangular shapes of the respective jobs allocated to the same printer 104 at intervals of one dot will be referred to as a "job graph". Since the length of individual rectangular shapes is proportional to a printing time of the individual jobs, the entire length of the job graph is proportional to a total processing time accumulated in the printer 104, namely the load of the respective printers 104. Therefore, it is possible to intuitively understand the magnitude of the load of the respective printers 104 from the length of the job graph.

For example, when a new job is input; a printer scheduled to process an existing job is determined or changed; there is a change in the state of some jobs or the printer 104; or the printing time of a job is recalculated with the progress of printing, and as a result, writing or rewriting of data is performed on any of the tables stored in the database management unit 303, the job graph display unit 309a redisplays the respective job graphs by referencing the respective tables after updating.

The color or shape of the respective rectangular shapes in the job graph indicates a job state corresponding to the rectangular shape. Moreover, a document name, a job ID, the start and ending time of a job are displayed in the job graph, and when the job graph is redisplayed, the job graph is updated by reflecting the new state of the respective jobs.

Moreover, in the schedule view, a time scale is displayed in the time scale display area 1102. Although the relative magnitude relation of the loads of the respective printers 104 can be understood from the length of the job graph without the time scale, it is not possible to know when the job is executed and the absolute magnitude of the load in terms of a printing time. By displaying the time scale, these kinds of information can be understood.

In the schedule view, the guide bar 1103 is also displayed which passes through a certain point on the time scale and passes across the job graphs of the respective printers 104 in a direction perpendicular to the time scale. Although the guide bar 1103 may be moved to a desired position on the time scale by the mouse 212, the guide bar 1103 may be automatically moved to the position of the current time so as to indicate the current time.

The guide bar 1103 can be used for various purposes. For example, when the guide bar 1103 indicates the current time, it is possible to understand how much time has passed from the start of the job and how much time is left until the end of the job. Moreover, the user may move the guide bar 1103 appropriately so as to check whether there is any difference in the processing timings of the respective jobs being printed in parallel by a plurality of printers 104. When a certain child job divided from the same parent job exists on the left side of the guide bar 1103 and the other child job exists on the right side thereof, the processing timings of the child jobs are different. In this case, it is difficult to efficiently coordinate the printing results. Thus, some of the jobs are reallocated so that the respective child jobs are processed approximately at the same time.

Moreover, the states of the respective printers 104 are displayed in the printer state display area 1104. In the example shown in FIG. 11, the printers 104 being managed, the type of sheet loaded on the trays of these printers 104, and information on whether a sheet is loaded or not are displayed. In addition, the operation state (READY, STOP, and the like) of the respective printers 104 and other information may be displayed.

In addition, a display element shown to the left of the printer names "Printer 1" and "Printer 2" in the printer state display area 1104 of FIG. 11 represents a unique color or the like for each printer, allocated to distinguish between the job graphs corresponding to the respective printers 104 displayed in the job graph display area 1101. Although a color is used in the present embodiment, the display element is not limited to a color, and one which can visually distinguish between the job graphs of each printer may be used. The job graph is displayed in a color allocated to each printer, and the display mode of the respective jobs allocated to the printer 104 is changed so that the respective jobs can be distinguished from each other. In this way, it is possible to identify a job graph of each printer and identify the respective jobs within the job graph of each printer.

When there is an interrupt for a job from the management client 102, the printer allocation unit 305 notified from the Web user interface 301 requests the printing time calculation unit 306 to recalculate the printing time of the job using the printing speed of the interrupt destination printer 104. Moreover, the printer allocation unit 305 requests the database management unit 303 to write a printer scheduled to print the job as the interrupt destination printer and printing time as the printing time of the job to the print schedule table 303b.

The functions of the Web user interface 301, the printing document receiving unit 302, the database management unit 303, the printer interface 304, the printer allocation unit 305, the printing time calculation unit 306, the temporary printing time calculation unit 307, the main view display unit 308, and the schedule view display unit 309 are realized by the CPU 201 and the like executing processing in accordance with the instructions described in a program recorded in a recording medium such as the ROM 202, the RAM 203, the HD 205, or the FD 207.

Figure 12:
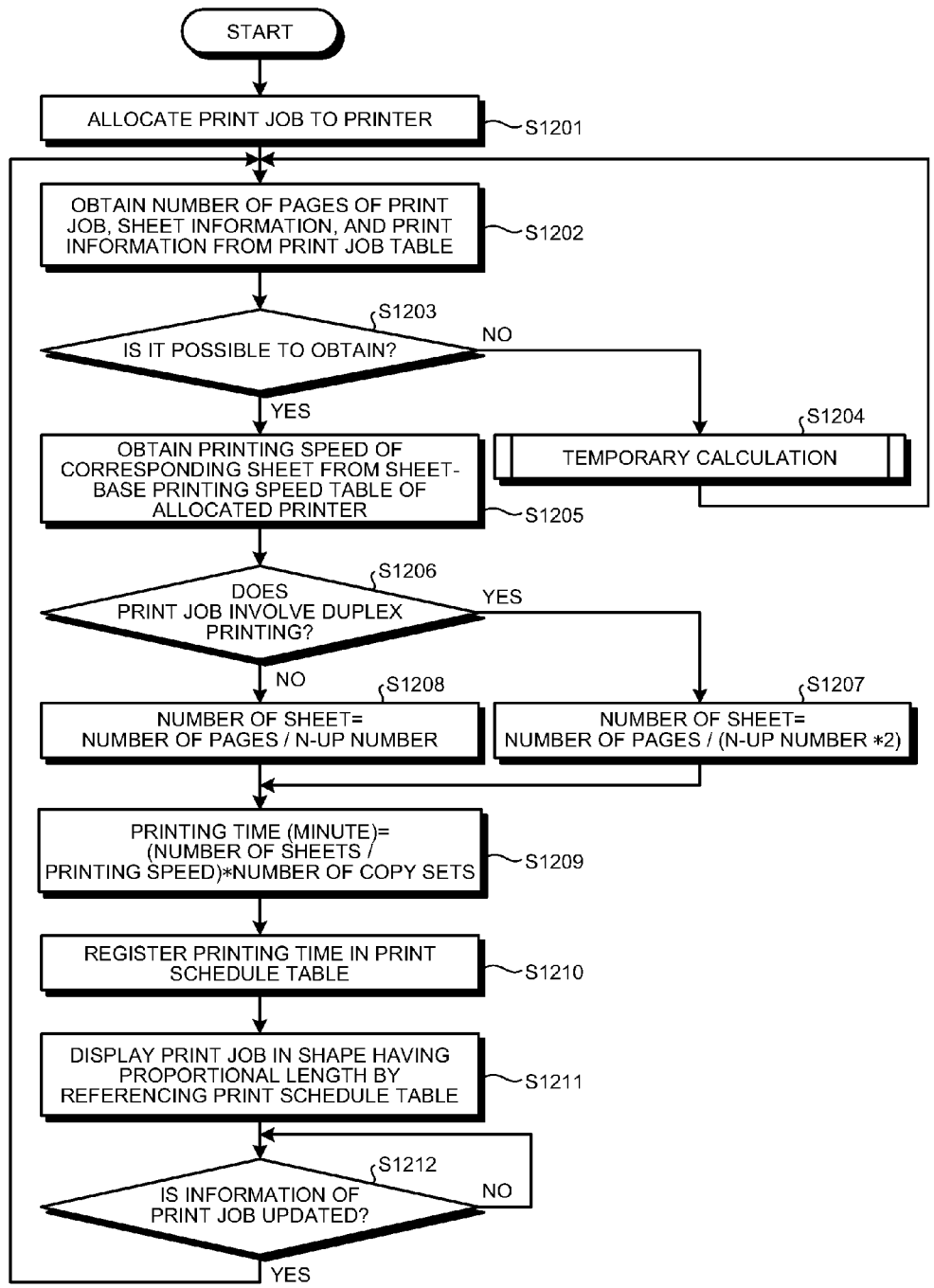
FIG. 12 is a flowchart illustrating a flow of processes from a calculation of a printing time to a displaying of a schedule view by a print control device according to the present embodiment.

Next, a flow of processes from a calculation of a printing time to a displaying of the schedule view by the print control device (the print server 103) of the present embodiment will be described. FIG. 12 is a flowchart illustrating a flow of processes from a calculation of a printing time to a displaying of a schedule view by the print control device according to the present embodiment. When the schedule view icon 1004 is pressed on the main view shown in FIG. 10, the process of this flowchart starts.

First, in step S1201, the printer allocation unit 305 allocates print jobs to the printer 104 automatically or through a manual input as described above.

Subsequently, the printing time calculation unit 306 executes the processes of steps S1202 to S1210. First, in step S1202, the number of pages of a print job, sheet information including the type of sheet, print information including the number of copy sets and an N-up number are obtained from the print job table 303a.

In this case, when it is possible to obtain information on the print job (step S1203: Yes), the flow proceeds to step S1205. If it is not possible to obtain the information (step S1203: No), the flow proceeds to step S1204 where a temporary calculation process, described later, is executed, and then, the flow returns to step S1202.

In step S1205, the printing speed of a corresponding sheet is obtained from the sheet-base printing speed table 303d of the allocated printer 104.

Subsequently, it is determined whether the print job involves duplex printing. When the print job involves duplex printing (step S1206: Yes), the flow proceeds to step S1207. If the print job does not involve duplex printing (step S1206: No), the flow proceeds to step S1208.

In step S1207, the number of pages designated for the print job is divided by a value twice the N-up number to obtain the number of sheets, and then, the flow proceeds to step S1209. The N-up number is the number of pages allocated to one sheet when a plurality of pages is printed on one side of a printing sheet.

On the other hand, in step S1208, the number of pages designated for the print job is divided by the N-up number to obtain the number of sheets, and then, the flow proceeds to step S1209.

In step S1209, the number of sheets obtained in step S1207 or S1208 is divided by the printing speed obtained in step S1205, and the division result is multiplied by the number of copy sets to obtain the printing time (minute).

Subsequently, in step S1210, the obtained printing time is registered in the print schedule table 303b.

Moreover, in step S1211, the schedule view display unit 309 displays the print job as a job graph by referencing the printing time registered in the print schedule table 303b in a shape having a length proportional to the printing time and in a display mode so that the user can identify the print job and the printer 104 to which the print job is allocated.

After that, when the information of the print job is not updated but remains constant (step S1212: No), the display is maintained. If the information of the print job is updated (the contents of the print job table 303a are changed in relation to the existing print job) (step S1212: Yes), the flow returns to step S1202. Then, the processes subsequent to step S1202 performed by the printing time calculation unit 306 are executed again. When a new print job is input, the flow returns to the process of step S1201 where the printer allocation unit 305 allocates the print job to the printer 104.

In this way, the processes from the calculation of the printing time to the displaying of the schedule view are performed.

Next, the temporary calculation process of step S1204 which is executed when it is not possible to obtain information on the print job from the print job table 303a in step S1202 will be described with reference to FIG. 13.

The processes of steps S1301 to S1306 are executed by the printing time calculation unit 306, and the processes of steps S1307 and S1308 are executed by the schedule view display unit 309.

First, in step S1301, an undefined printing speed is obtained from the sheet-base printing speed table 303d of the printer 104 to which the print job is allocated by the printer allocation unit 305.

Subsequently, in step S1302, the number of bytes of the print data of the print job is obtained.

In step S1303, the obtained number of bytes of the print data is divided by the number of bytes per page defined as a system setting, and the calculation result is obtained as the number of pages.

Subsequently, in step S1304, the number of pages obtained in step S1303 is divided by the N-up number (always "1"), and the calculation result is obtained as the number of sheets. In this example, the number of sheets is obtained assuming that the N-up number is 1. Thus, the number of sheets is identical to the number of pages.

Subsequently, in step S1305, the number of sheets obtained in step S1304 is divided by the printing speed obtained in step S1301, and multiplied by the number of copy sets (always "1"), and the calculation result is obtained as the temporary printing time (minute). In this example, the temporary printing time is calculated assuming that the number of copy sets is 1.

Subsequently, in step S1306, the temporary printing time obtained in step S1305 is registered in the print schedule table 303b as the printing time.

Subsequently, in step S1307, the schedule view display unit 309 displays the job graph corresponding to the print job of which the temporary printing time is calculated by referencing the printing time (in this case, the temporary printing time is already registered in step S1306) of the print schedule table 303b in a shape having a length proportional to the temporary printing time and in a shape or color different from the normal job graph.

After that, when the information of the print job is not updated but remains constant (step S1308: No), the display is maintained. If the information of the print job is updated (the contents of the print job table 303a are changed in relation to the existing print job including the print job having been subjected to the temporary calculation process) (step S1308: Yes), the flow returns to step S1202. Then, the processes subsequent to step S1202 performed by the printing time calculation unit 306 are executed again. When a new print job is input, the flow returns to the process of step S1201 where the printer allocation unit 305 allocates the print job to the printer 104.

Hereinabove, the temporary calculation process in step S1204 has been described.

Figure 15C:
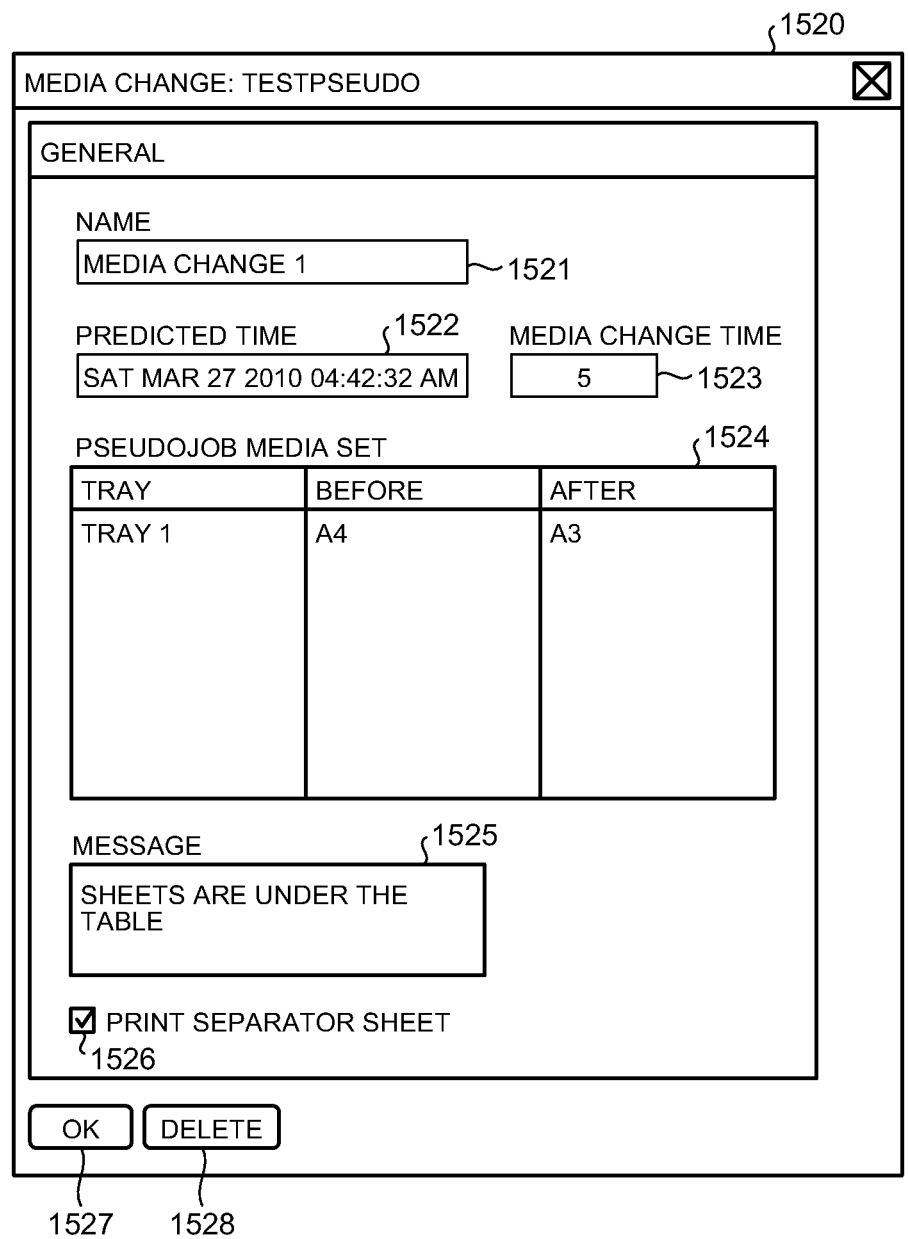
FIG. 15C is another diagram illustrating a GUI used when creating a sheet change job.

Next, creation of a sheet change job will be described. FIGS. 15A to 15C illustrate a graphical user interface (GUI) used when creating a sheet change job. The contents set using this GUI are registered in the sheet change job table 303f described above.

The printer 104 to which a sheet change job is allocated is selected in a display element 1501 of a GUI 1500 shown in FIG. 15A. Moreover, the position in which the sheet change job is inserted is set in a display element 1502, whereby an allocation order of the sheet change job among the respective jobs is determined. Moreover, a sheet change time (an operation time needed for the sheet change operation) is set in a display element 1503. When it is OK with the contents therein, the user presses a Next button 1504 to proceed to the next GUI 1510 shown in FIG. 15B. When the user wants to cancel the settings, the user presses a Cancel button 1505.

In the GUI 1510 shown in FIG. 15B, the user enters the name (in this example, a sheet change job ID) of the sheet change job in a display element 1511. First, in the left column of a display element 1512, the name of a tray of the printer 104 that is set as a printer to which the sheet change job is allocated is displayed. Moreover, in the center and right columns of the display element 1512, the kinds of sheets before and after the sheet change operation are displayed and set. In this GUI 1510, the user can input a message to be notified to the operator in a display element 1513 and set information on whether or not to print a separator sheet in a display element 1514. When printing the separator sheet, the message is printed so that the operator is notified of the contents of the message during the sheet change. When it is OK with the contents therein, the user presses a Finish button 1517 to proceed to the next GUI 1520 shown in FIG. 15C. When the user wants to cancel the settings, the user presses a Cancel button 1516. When the user wants to return to the previous GUI 1500, the user presses a Previous button 1515.

In the GUI 1520 shown in FIG. 15C, the previously set contents are displayed in display elements 1521, and 1523 to 1526, and the position (date and time) on the time scale where the sheet change job is inserted is displayed in a display element 1522. This date and time is calculated by the printing time calculation unit 306 based on the contents of the print schedule table 303b and the previously set contents. The display element 1521 corresponds to the display element 1511 in FIG. 15B, the display element 1523 corresponds to the display element 1503 in FIG. 15A, the display element 1524 corresponds to the display element 1512 in FIG. 15B, the display element 1525 corresponds to the display element 1513 in FIG. 15B, and the display element 1526 corresponds to the display element 1514 in FIG. 15B. When it is OK with the contents displayed on the GUI 1520, the user presses an OK button 1527, whereby the setting contents are determined, and the contents are registered in the sheet change job table 303f. When the user wants to delete a sheet change job in the course of the setting input process, the user presses a Delete button 1528 to delete the sheet change job.

Next, a flow of processes from an allocation of a sheet change job to a displaying of a schedule view by the print control device of the present embodiment will be described with reference to FIG. 14. FIG. 14 is a flowchart illustrating a flow of processes from a allocation of a sheet change job to a displaying of a schedule view.

First, in step S1401, the printer allocation unit 305 determines a printer 104 to which a sheet change job is allocated by referencing the sheet change job table 303f.

Subsequently, in step S1402, the printer allocation unit 305 determines the position (job allocation order) where the sheet change job is inserted by referencing the sheet change job table 303f.

Subsequently, in step S1403, the printer allocation unit 305 determines a tray from which a sheet is changed by referencing the sheet change job table 303f.

Subsequently, in step S1404, the printer allocation unit 305 determines a sheet change time of the sheet change job (the time allocated for the sheet change job on the time scale) by referencing the print schedule table 303b (print completion time of a print job located before the position where the sheet change job is inserted) and the sheet change job table 303f (allocation order, a sheet change time (operation time)).

Subsequently, in step S1405, the printer allocation unit 305 registers the sheet change job having the determined contents in the print schedule table 303b.

Subsequently, in step S1406, the schedule view display unit 309 displays the job graph corresponding to the sheet change job by referencing the operation time (sheet change time) needed for the sheet change, registered in the print schedule table 303b, in a display mode having a length proportional to the operation time and having a shape or color different from the normal job graph.

In some cases, since the sheet change operation is performed and finished earlier than its scheduled operation start time, a job graph indicating the sheet change job is deleted at the time when a sheet(s) is loaded on the tray by the sheet change operation, and the next print job is moved forward and displayed. Moreover, in some cases, since the sheet change operation is finished earlier than its scheduled operation start time, the length of the job graph indicating the sheet change job is decreased with the progress of the sheet change job, and the next print job is moved forward and displayed. When such changes occur, the printing time calculation unit 306 changes the contents of the print schedule table 303b in synchronization with the changes, and the schedule view display unit 309 redisplays the job graph based on the changed print schedule table 303b to thereby change the display.

Hereinabove, the flow of processes from the allocation of the sheet change job to the displaying of the schedule view by the print control device of the present embodiment has been described.

As described above, the print control device (and a print control method thereof and a program thereof) according to the present embodiment is capable of calculating the printing time different for each sheet being used and the appropriate printing time taking the time (operation time needed for the sheet change operation) associated therewith into consideration. Thus, it is possible to display an overall system load and a distribution state of loads to the respective printers in a more accurate manner.

While the embodiment for carrying out the present invention has been described, the present invention is not limited to the embodiment described above. The present invention can be modified within the range without departing from the spirit of the present invention.

Other Embodiment

A program for realizing the functions (the printer allocation unit 305, the printing time calculation unit 306, the temporary printing time calculation unit 307, the main view display unit 308, and the schedule view display unit 309) of the print control device (the print server 103) of the present embodiment is provided in a state of being included in a nonvolatile storage medium such as the HDD 204 of the print server 103 which is an information processing apparatus. Alternatively, the program is provided as a file having an installable format or an executable format in a state of being recorded on a computer readable recording medium such as a CD-ROM, a flexible disk (FD), a CD-R, or a digital versatile disk (DVD).

Alternatively, the program may be provided or distributed by storing the program on a computer connected to a network such as the Internet and downloading the program through the network.

According to the present invention, the print control device calculates the printing time different for each sheet being used and the appropriate printing time taking the time (operation time needed for a sheet change operation) associated therewith into consideration. Thus, it is possible to calculate the printing time with high accuracy and obtain an effect in that an overall system load and a distribution state of loads to the respective printers can be displayed in a more accurate manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print control device configured to control plural printers, said print control device comprising:
    a sheet-base printing speed table that indicates, for each particular sheet size amongst a plurality of sheet sizes, a sheet-base printing speed corresponding to the particular sheet size;
    one or more printer properties tables that store, for said each particular printer amongst the plurality of printers, properties of the particular printer;
    a print schedule table that registers one or more job schedule items, each job schedule item indicating a corresponding scheduled job to be performed, a scheduled printer on which the scheduled job is to be performed, an allocated job time amount and a schedule job start time at which the scheduled job is scheduled to start to be performed by the scheduled printer; and a printer allocation unit that performs, when a print job is received, printer allocation of the plurality of printers based on (i) information maintained in the sheet-base printing speed table, (ii) information maintained in the printer properties tables, and (iii) properties of the print job, and registers a sheet change job to perform a sheet change operation on a specified printer at a scheduled job time, in the print schedule table; and a printing time calculation unit that calculates a printing time associated with the received print job, based on information obtained from the print job, and in a case that the sheet change job scheduled in the print schedule table is completed in an amount of time less than the allocated job time amount, moves the next job scheduled in the print schedule table forward in the print schedule table and displayed.

2. The print control device according to claim 1, further comprising a temporary printing time calculation unit that calculates a temporary printing time based on a predefined value, when it is not possible to obtain information necessary for calculating the printing time, from the print job, and a first display control unit that displays he print job by arranging similarly to a normal print job in a predetermined display mode having a length proportional to the calculated temporary printing time that is identifiable that the printing time is calculated temporarily.

3. The print control device according to claim 1, further comprising a changing unit that changes information in the print job, wherein the printing time calculation unit recalculates the printing time associated with the print job, when the information relating to the print job is changed.

4. The print control device according to claim 2, further comprising:

a second display control unit that displays a tray that can be used by a selected printer amongst the plurality of printers controlled by the print control device and the type of sheet currently loaded on the tray, wherein the first display control unit displays the sheet change job by arranging similarly to a normal print job in a predetermined shape having a length proportional to the processing time needed for the sheet change operation and a figure identifiable of the sheet change job.

5. The print control device according to claim 1, wherein information of the sheet-base printing speed table is updated sequentially based on printing results of a printer.

6. The print control device according to claim 1, wherein information of the sheet-base printing speed table is registered with a default printing speed when a new sheet is taken into a tray of the printer.

7. The print control device according to claim 4, wherein the first display control unit changes the display of the sheet change job at a time when a sheet is loaded onto a tray by the sheet change operation and changes the display of a following print job in accordance with the change.

8. The print control device according to claim 1, further comprising a designating unit that designates an interrupt position for the sheet change job.

9. The print control device according to claim 1, further comprising a registering unit that registers a message to be notified to the sheet change job, when performing the sheet change operation.

10. The print control device according to claim 9, further comprising a notifying unit that prints the registered message immediately before performing the sheet change operation and thereby notifies the printed message to an operator.

11. The print control device according to claim 1, further comprising a time designating unit that designates a sheet change time of the sheet change job.

12. A print control method for a print control device configured to control plural printers and having (i) a sheet-base printing speed table that indicates, for each particular sheet size amongst a plurality of sheet sizes, a sheet-base printing speed corresponding to the particular sheet size, (ii) one or more printer properties tables that store, for said each particular printer amongst the plurality of printers, properties of the particular printer and (iii) a print schedule table that registers one or more job schedule items, each job schedule item indicating a corresponding scheduled lob to be performed, a scheduled printer on which the scheduled job is to be performed, an allocated job time amount and a schedule job start time at which the scheduled job is scheduled to start to be performed by the scheduled printer, the method comprising:

receiving a print job;

performing, by a printer allocation unit of the print control device when the print job is received, printer allocation of a printer selected from a plurality of printers based on (i) information maintained in the sheet-base printing speed table, (ii) information maintained in the printer properties tables, and (iii) properties of the print job;

calculating a printing time associated with the received print job, based on information obtained from the print job;

registering a sheet change job to perform a sheet change operation on a specified printer at a scheduled job time, in the print schedule table; and in a case that the sheet change job scheduled in the print schedule table is completed in an amount of time less than the allocated job time amount, moving the next job scheduled in the print schedule table forward in the print schedule table and displayed.

13. A computer program product comprising a non-transitory computer-usable medium having computer-readable program codes embodied in the medium for print control in a print control device configured to control plural printers and having (i) a sheet-base printing speed table that indicates, for each particular sheet size amongst a plurality of sheet sizes, a sheet-base printing speed corresponding to the particular sheet size, and (ii) one or more printer properties tables that store, for said each particular printer amongst the plurality of printers, properties of the particular printer and (iii) a print schedule table that registers one or more job schedule items, each job schedule item indicating a corresponding scheduled job to be performed, a scheduled printer on which the scheduled job is to be performed, an allocated job time amount and a schedule job start time at which the scheduled job is scheduled to start to be performed by the scheduled printer, the program codes when executed causing a computer to execute:

receiving a print job;

performing, when the print job is received, printer allocation of a printer selected from a plurality of printers based on (i) information maintained in the sheet-base printing speed table, (ii) information maintained in the printer properties tables, and (iii) properties of the print job;

calculating a printing time associated with the received print job, based on information obtained from the print job;

registering a sheet change job to perform a sheet change operation on a specified printer at a scheduled job time, in the print schedule table; and in a case that the sheet change job scheduled in the print schedule table is completed in an amount of time less than the allocated job time amount, moving the next job scheduled in the print schedule table forward in the print schedule table and displayed.

14. The print control method according to claim 12, wherein the sheet change job is registered in the print schedule table at a timing of one or both of (i) after an end of one print job allocated to the selected printer in the job schedule and (ii) before a start of another print job, immediately following the one print job, allocated to the selected printer in the job schedule.

15. The print control device according to claim 1, wherein the printer allocation unit registers the sheet change job in the print schedule table at a timing of one or both of (i) after an end of one print job allocated to the selected printer in the job schedule and (ii) before a start of another print job, immediately following the one print job, allocated to the selected printer in the job schedule.

16. The print control device according to claim 2, wherein when it is not possible to obtain the information necessary for calculating the printing time from the print job, the temporary printing time calculation unit calculates the temporary printing time based on the predefined print speed value retrieved from the printing speed table.

17. The print control device according to claim 2, wherein the temporary printing time calculation unit calculates the temporary printing time by dividing a total amount of print data of the received print job by a system-set amount of data per page, and then divided by the predefined print speed value retrieved from the printing speed table.

* * * * *